United States Patent [19]

Finch et al.

[11] Patent Number: 4,794,589
[45] Date of Patent: Dec. 27, 1988

[54] ASYNCHRONOUS PACKET MANAGE

[75] Inventors: William W. Finch, Lisle, Ill.; Gulay Sencer, McLean, Va.

[73] Assignee: GTE Communication Systems Corporation, Phoenix, Ariz.

[21] Appl. No.: 908,111

[22] Filed: Sep. 16, 1986

[51] Int. Cl.⁴ .............................................. H04J 3/02
[52] U.S. Cl. ............................................................ 370/60
[58] Field of Search .................. 395/121, 17, 49, 117, 395/; 370/94, 88, 119, 60

[56] References Cited

U.S. PATENT DOCUMENTS

| | | | |
|---|---|---|---|
| 4,578,789 | 3/1986 | Middleton et al. | 370/67 |
| 4,584,690 | 4/1986 | Cafiero et al. | 375/18 |
| 4,627,046 | 12/1986 | Bellamy | 370/58 |
| 4,637,035 | 1/1987 | Betts | 375/12 |
| 4,750,171 | 6/1988 | Kedar et al. | 370/94 |

Primary Examiner—Douglas W. Olms
Assistant Examiner—Melvin Marcelo
Attorney, Agent, or Firm—Gregory G. Hendricks

[57] ABSTRACT

The Asynchronous Packet Manager is the interface for transferring data in a first format between a data terminal equipment and a combination data and telephone switching system in a properietary packet format. A microprocessor accepts data from a universal asynchronous receiver transmitter and forwards the data to a mini packet receiver transmitter, when it is formatted into mini packets and converted to an alternate mark inversion signal and sent to the switching network.

1 Claim, 15 Drawing Sheets

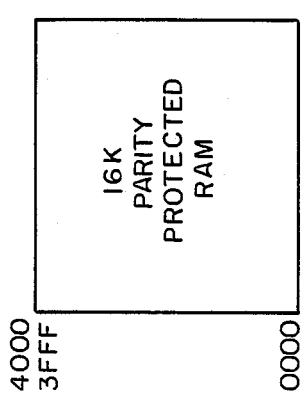
FIG. 11
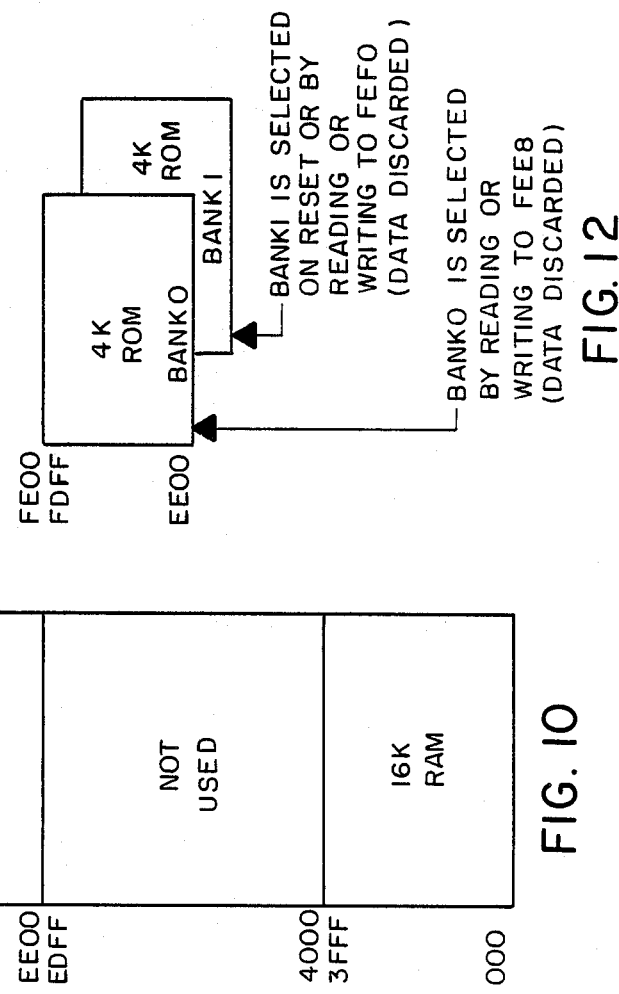
FIG. 13
FIG. 12
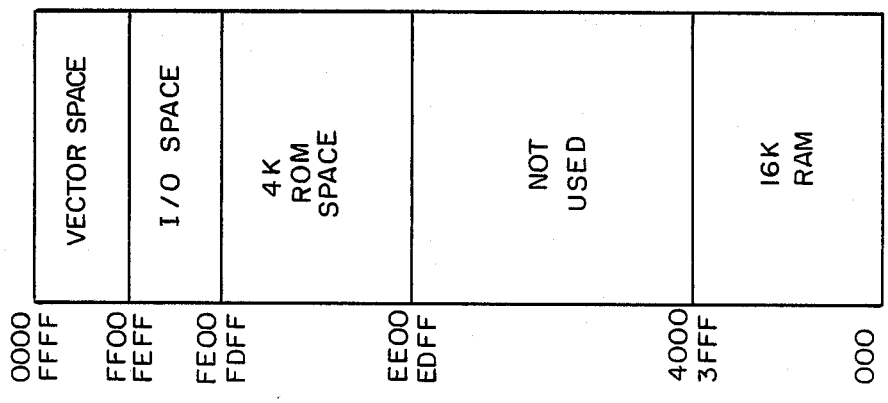
FIG. 10

FIG. 14

FEFF – FEFA: NOT DEFINED

READ FEF9:
| 7 | 6 | 5 | 4 | 3 | 2 | 1 | 0 |
|---|---|---|---|---|---|---|---|
| LAST BYTE | I/O REG FULL | 0 | MPA | SA | 0 | 0 | SA INT ENB'D |

WRITE:
| 7 | 6 | 5 | 4 | 3 | 2 | 1 | 0 |
|---|---|---|---|---|---|---|---|
| ENB SA | x | x | x | x | x | x | TEST |

READ FEF8: RECEIVE TRANSPARENT DATA

WRITE: TRANSMIT TRANSPARENT DATA

FIG. 15

FEF7 – FEF1: NOT DEFINED

READ FEF0:
| 7 | 6 | 5 | 4 | 3 | 2 | 1 | 0 |
|---|---|---|---|---|---|---|---|
| x | x | x | x | x | x | x | x |

WRITE: SWITCH ROM TO BANK1
| 7 | 6 | 5 | 4 | 3 | 2 | 1 | 0 |
|---|---|---|---|---|---|---|---|
| x | x | x | x | x | x | x | x |

SWITCH ROM TO BANK1

FIG. 16

FEEF – FEE9: NOT DEFINED

READ FEE8:
| 7 | 6 | 5 | 4 | 3 | 2 | 1 | 0 |
|---|---|---|---|---|---|---|---|
| x | x | x | x | x | x | x | x |

SWITCH ROM TO BANK0

WRITE:
| 7 | 6 | 5 | 4 | 3 | 2 | 1 | 0 |
|---|---|---|---|---|---|---|---|
| x | x | x | x | x | x | x | x |

SWITCH ROM TO BANK0

FIG. 17

FEE7 – FEE1: NOT DEFINED

READ FEE0:
| 7 | 6 | 5 | 4 | 3 | 2 | 1 | 0 |
|---|---|---|---|---|---|---|---|
| 1,2, OR3 ACT. | 4,5, OR6 ACT. | 7,8, OR 9 ACT. | 1,4,7, OR * ACT. | 2,5,8, OR 0 ACT. | 3,6,9, OR # ACT. | *,0, OR # ACT. | ANY KEY ACT. |

WRITE: NOT DEFINED

FIG. 19

FED7-FED1

| 7 | 6 | 5 | 4 | 3 | 2 | 1 | 0 |
|---|---|---|---|---|---|---|---|
| NOT DEFINED | | | | | | | |

READ FED0 / WRITE

| 7 | 6 | 5 | 4 | 3 | 2 | 1 | 0 |
|---|---|---|---|---|---|---|---|
| X | X | X | X | X | X | X | X |

MASTER ENABLE: ENABLES ALL INTERRUPTS

FIG. 18

FEDF-FED8

| 7 | 6 | 5 | 4 | 3 | 2 | 1 | 0 |
|---|---|---|---|---|---|---|---|
| NOT DEFINED | | | | | | | |

READ FEDA / WRITE

| 7 | 6 | 5 | 4 | 3 | 2 | 1 | 0 |
|---|---|---|---|---|---|---|---|
| *RI @ BUSY | *DCD @ DCD | *DSR @ DTR | *CTS @ RTS | *BUSY @ RI | **X @ DCD | *DTR @ DSR | *RTS @ CTS |
| X | X | X | X | *BUSY @ RI | **X @ DCD | *DTR @ DSR | *RTS @ CTS |

READ FED9 / WRITE

| 7 | 6 | 5 | 4 | 3 | 2 | 1 | 0 |
|---|---|---|---|---|---|---|---|
| 1 | 1 | RESET SW | LPBK SW | LINK LED | CALL LED | LINE LOOP-BACK | UART LOOP-BACK |
| X | X | X | X | LINK LED | CALL LED | LINE LOOP-BACK | UART LOOP-BACK |

READ FED8 / WRITE

| 7 | 6 | 5 | 4 | 3 | 2 | 1 | 0 |
|---|---|---|---|---|---|---|---|
| RAM PARITY ERR | *DTE/ @ DCE | PWR ON | WDT TIME-OUT | CONFIGURATION STRAPS | | | |
| X | X | X | X | 1 | 1 | 0 | 0 |

WATCH DOG TIMER
A = INITIATE & SUSTAIN
0-9, B-D = NOT DEFINED

FIG. 21

| | 7 | 6 | 5 | 4 | 3 | 2 | 1 | 0 |
|---|---|---|---|---|---|---|---|---|
| READ FEC7-FEC2 | NOT DEFINED ||||||||
| READ FEC1 | LAST BYTE | I/O REG | 0 | MPA | SA | BIT ERR (CRC) | SYNC ERR | SA INT ENB |
| WRITE FEC1 | ENB SA INT | DATA-ONLY MODE | S-RESET | BAUD RATE SELECT 0=256K, 3=4K || MST/SLV | FULL/HALF | BYTE MODE 12/10 |
| READ FEC0 | RECEIVE NON-TRANSPARENT DATA ||||||||
| WRITE FEC0 | TRANSMIT NON-TRANSPARENT DATA ||||||||

FIG. 20

| | 7 | 6 | 5 | 4 | 3 | 2 | 1 | 0 |
|---|---|---|---|---|---|---|---|---|
| READ FECF-FECC | NOT DEFINED ||||||||
| READ FECB WRITE | STOP BITS 0=1, 1=2 | WORD LENGTH 0=8, 1=7, 2=6, 3=5 || BRG ENB | BAUD RATE GEN. 3=110, 6=300, 8=1200, A=2400, C=4800, E=9600, F=19200 ||||
| READ FECA WRITE | PAR. CHK. CONT. 0,2,4,6=DISABLE 1=ODD, 3=EVEN 5=MARK, 7=SPACE ||| DIG LOOP-BACK | TX CONTS. 0=OFF;DIS INT 1=ON; ENB INT | RX INT 0=EN 1=DIS || UART ENB |
| READ FEC9 | IRQ | 0=KEY-BOARD 1=NO KB | 0 | TX DATA REG MT | RX DATA REG FULL | OVER-RUN | FRM ERR | PAR ERR |
| WRITE FEC9 | X | X | X | X | X | X | X | X |
| | PROG. RESET: RESET FECA BITS 0-4, RESET FEC9 BIT 2 ||||||||
| READ FEC8 | RECEIVE DATA ||||||||
| WRITE FEC8 | TRANSMIT DATA ||||||||

FIG. 24

| DTE & LB=0 OR DCE & LB=1 | | | | DTE | | |
|---|---|---|---|---|---|---|
| 7 | 6 | 5 | 4 | 3 | 2 1 | 0 |
| RI | DCD | DSR | CTS | BSY | X DTR | RTS |
| | | | | | | FEDA |

| DCE & LB=0 OR DTE & LB=1 | | | | DCE | | |
|---|---|---|---|---|---|---|
| 7 | 6 | 5 | 4 | 3 | 2 1 | 0 |
| BSY | DCD | DTR | RTS | | RI DCD DSR | CTS |
| | | | | | | FEDA |

FIG. 22

| 0000 | |
|---|---|
| FFF9 | NMI, IRQ, RESET, BREAK VECTORS |
| FFFA | |
| FF00 | NOT DEFINED |

FIG. 23

ROM ADD SPACE

| FDFF | BANK1 |
| F000 | |
| EFFF | BANK1 |
| EE00 | |

| F0FF | BANK0 |
| F000 | |
| EFFF | BANK0 |
| EE00 | |

PHYSICAL ROM

| 1DFF | ROM |
| 1000 | |
| 1FFF | ROM |
| 1E00 | |

| 0DFF | ROM |
| 0000 | |
| 0FFF | ROM |
| 0E00 | |

FIG. 25

Signals (top to bottom):
- Ø2
- Ø4
- R/$\overline{W}$, A0-15
- $\overline{RAM\ 0-1}$, $\overline{ROMCS}$, I/O, $\overline{CHI}$, $\overline{VSP}$
- $\overline{ROE}$, $\overline{PCS}$
- $\overline{RWE}$
- WRITE DATA VALID Timing values: REF 500, 240 MIN, 240 MIN, 385 MAX, 25 MIN, 125 MAX, 175 MAX, 25 MIN, 310 MAX, 435 MAX, 235 MAX, 50 MAX, 50 MAX, 50 MAX

ASYNCHRONOUS PACKET MANAGE

CROSS REFERENCE TO RELATED APPLICATIONS

The following applications filed on even date herewith and assigned to the same assignee disclose aspects pertinent to the present application and are hereby incorporated as if fully disclosed herein:

Mini Packet Receiver Transmitter application Ser. No. 908,056 in the name of Hoger Opderbeck, Gulay Sencer, William Carr and Steven Byars;

Packet Bus Interface, application Ser. No. 908,055 in the name of Steven Byars and William Carr;

Synchronous Packet Manager, application Ser. No. 908,112 in the name of William W. Finch and Gulay Sencer; and Voice Packet Assembler Disassembler application Ser. No. 908,076 in the name of Gary Schlecte and John Csapo.

BACKGROUND OF THE INVENTION

1. Field of the Invention

The present invention pertains to asynchronous formatters and more particularly to asynchronous formatters which convert packets in CCITT X.25 format into a proprietary format adopted to PCM switching.

2. Background of the Invention

Currently intelligent data networks are based on a transmission technique known as packet switching. These data networks employ special purpose communication switching minicomputers, typically interconnected with leased lines to carry user data from the user source location to its destination.

In general the data messages from users of the network are accepted by the network minicomputers, which assemble them into fixed length segments called packets. The packets are then transmitted through the network in a store and forward fashion to their destination. Each packet is individually handed forward along the best available path and is error checked each time another link is traversed. Complete messages are then reassembled from their constituent packets at the minicomputer which interfaces with the destination user site.

Since many of these intelligent data networks are offered by common carriers a standardized software dependent interface must be employed. The software interface offered on most of these public networks is that defined by its CCITT (Consultative Committee for International Telephone and Telegraph) and known as the X.25 interface. The X.25 defines the procedures for the packet assembly and disassembly between the terminal and the packet switching network. The procedures for this handling of these packets within the switching network are called the network level protocol. This intra network protocol is not CCITT standard and is usually different on each network. Packet formats in the X.25 protocol involve the formats of data and control packets, in general the formats of X.25 packets all contain four (4) basic fields:

General Format Indicator
Logical Channel Identification Number
Packet Type Identifier
Information Field General Format Indicator the first header field is the general format indicator. The primary purpose of the general format indicator is to specify the format of modulo number (modulus) being used for this packet.

Logical Channel Identification Number. Every control and data packet must contain a two-part logical channel identification number. It consists of a logical channel group number in four bits of the first byte of the packet header, and an eight-bit logical channel number that takes up the entire second byte of the packet header.

The logical channel numbers constitute a numbering scheme that is local to the user machine and its network interface. The two users involved in a virtual call or a permanent virtual circuit will probably use different logical channels numbers for their connection with their local Data Circuit Equipments (DCEs). In the initial setup procedure for a virtual call, the network makes an association between the real addresses of the user machines and their logical channel numbers. Then, during the progress of the call, the network itself has to add additional addressing information to the logical channel identification numbers carried in the packets in order to identify the user machines. The addition of this addressing information is left to the network implementor and does not concern the user of the user/network interface.

Packet Identifier. The third byte of a packet header is known as the Packet Type Identifier. The Packet Type Identifier describes the function of the packet being transmitted. The packet information field following the packet identifier will provide additional packet header information depending upon the function of a control packet or it will contain the user data if it is a data packet.

Call request packets. The call request packet normally contains the network address of the destination device and may contain the address of the originating device. Both addresses are variable in length so that long addresses could be used if necessary. These addresses are located in the first bytes of the information field of the Call Request packet. Each digit of the address is encoded in a half-byte of the address field. The address field is preceded by two half-bytes that state how many digits are in each address.

The addresses may be followed by a facilities field, which is also of variable length. This field is present when the originating machine wants to make a call with some optional characteristics that must be communicated to the destination machine. Recommendation X.25 specifies several such options. A calling party might indicate that the called party is to pay for the call. A maximum data length might be requested because of limited buffer size. A specific flow control might be requested. The CCITT permits all of these options and allows for other optional facilities that might be added in the future. For each optional facility requested, the facilities field contains two bytes. The first byte indicates the type of facility requested. The second byte contains a parameter associated with the request: for example, maximum data length.

The Incoming Call packet that travels from the second data circuit terminating equipment to the called data terminating equipment has the same format as the Call Request packet and carries most of the same information. The called data circuit terminating equipment, however, must select its own logical channel numbers, so the logical channel group number and the logical channel number will be different in the Incoming Call packet and the Call Request packet.

To complete the virtual call connection, the called data terminating equipment sends a Call Accepted packet to its data circuit terminating equipment, which is forwarded to the calling data terminating equipment in the form of a Call Connected packet. The Call Accepted/Call connected packet has a relatively simple format, since the optional facilities have already been decided on and the network addresses were carried in the Call Request/Incoming call packet. All the information it needs to carry is contained in the three-byte header.

Before the calling party initiates the virtual call, the logical channel is in a ready state. After the Call Request packet has been passed from the data terminating equipment to its data circuit terminating equipment, the logical channel is in the data terminating equipment waiting state. When the called data circuit terminating equipment passes the incoming Call packet to the called data terminating equipment, the logical channel is placed in the data circuit terminating equipment waiting state. When the called data terminating equipment returns the Call Accepted/Call Connected packet, the logical channel is placed in the data transfer state, and normal data transmission can begin. The virtual call has been set up.

Data Packets. When set data packet is indicated, the bits of byte 3 are broken into three (3) subfields:
(1) A packet receive sequence number (R)
(2) A more-data bit
(3) A packet send sequence number (S)

The functions of the packet receive sequence number and send sequence number are similar to the sequencing performed at the frame level in HDLC. The packet seqeence numbers through are independent and will have different values from the link layer numbers.

Data packets for each virtual call are sequenced at packet level. Each data packet contains a Packet Send Count P(S), which will advance with succeeding data packets, and a Packet Receive Count P(R), which will indicate the next expected data packet.

Note that the sequence numbering N(S) and N(R) at the frame level is used to sequence and authorized all 1-frames at the ling level. The sequence numbering P(S) and P(R) at packet level is used to sequence and authorize data packets for a virtual call in the packet network.

The M bit of the third byte of a data packet header is called the More-data bit. When this bit is set to 1, it indicates that more of the same user data record follows in the next sequential packet. The More-data bit can only be set in a packet that contains the maximum allowable number of data bits. Although the CCITT recommends that the maximum data field length be 128 bytes, it does state that some telecommunications administrations may support other maximum data lengths: 16, 32, 64, 256, 512, or 1,024 bytes, or, exceptionally 255 bytes. In this case, data packets may have to be split or combined as they pass from one network to another. The More-data bit would be used to facilitate this splitting and recombination.

In this discussion of the third byte packet, we have dealt exclusively with transmission using modulo 8 counts. As we said earlier however, the CCITT allows the use of modulo 128 counts. When the general format identifier indicates that modulo 128 counts are being used for a data packet, three bits are not enough to specify either a send sequence number or a receive sequence number. In these cases, a fourth byte in the header is used to extend each of the sequence number fields by four bits.

Most current networks are being implemented with modulo 8 numbering. However, modulo 128 numbering will probably be employed when satelite links are used and when traffic volumes build up.

For data transfer during a typical data transmission over a permanent or temporary virtual circuit, three (3) types of packets may be used:
(1) Data Packets
(2) Receive Ready packets
(3) Receive Not Ready packets The logical channel remains in the "data transfer" state throughout the data transmission.

Once a virtual circuit has been established, users can transmit data back and forth in Data Packets.

If both user machines on a virtual circuit are sending data, the receipt of data packets can be acknowledged by piggybacking the receive sequence numbers on returning data packets. If only one machine is transmitting data however, the receipt of data packets must be acknowledged by special control packets.

A Receive Ready control packet is used to indicated willingness to receive a given number of packets and to acknowledge the correct receipt of data packets already transmitted. The Receive Ready packet carries a three-bit receive sequence number in the third byte of its packet header. These packets carry no send sequence numbers and no information field.

If a user machine is temporarily unwilling or unable to receive further data packets, it returns a Receive Not Ready packet to the other user machine. Like the Receiver ready packet, this packet carries a receive sequence number but no send sequence number. A Receive Not Ready packet acknowledges the correct receipt of data packet, and causes the other user machine to temporarily suspend its data transmission. When a user machine is once again ready to receive data, it sends a Receive Ready packet to the other user machine, and the data transmission is resumed.

Virtual Call Disconnect. A virtual call may be disconnected at the request of either user, or, in special cases, at the request of the network. Three (3) different packet types and four (4) different logical channel states may be involved in this termination process. These packet types and channel states are listed below:

Packet Types

Clear Request
Clear Indication
Clear Confirmation

Logical Channel States

Data Transfer
Ready
DTE Clear Request
DCE Clear Indication

When a user decides to disconnect a virtual call, it sends a Clear Request packet to its DCE. This packet has a small information field that explains the reason for disconnecting the virtual call. The logical channel is then in the data terminating equipment (DTE) clear request state. The Data circuit equipment responds when it is ready to clear the channel with a Clear Confirmation packet. The Clear Confirmation packet is a simple control packet with no information field. The logical channel is now in the ready state. The data circuit equipment then transmits the Clear Request to the data circuit equipment at the other end of the logical link. That data circuit equipment sends a Clear Indication packet to the user machine in question. The Clear Indication packet has the same format as the Clear Request packet. The transmission of the Clear Indication packet to a data terminating equipment places the logical channel in a data circuit clear indication state. The user machine responds with a Clear Confirmation packet. The cleared logical channel is then back in the ready state.

Normally it is the user machine that initiates the clearing of a call. When there are network problems, however, the network equipment may need to initiate the clearing. In these cases, the data circuit equipment clears the call by sending a Clear Indication packet to the user machine. The user responds with a Clear Confirmation packet, and the call is disconnected.

SUMMARY OF THE INVENTION

The Asynchronous packet manager APM is used to interface terminals or printers to the OMNI switch when it is in the DCE mode. It is connected to the OMNI switch via the Voice Packet Line Card (VPLC). Once an APM is connected to the Local Wire Loop to the VPLC on the OMNI switch, the unit will automatically be put into service, i.e operating software required for data manipulation between the Terminal and the switch is downloaded to the ARM Ram. The APM Link LED will light up when download is completed, indicating that the APM is in service.

To use the terminal a call is established to a Public Data Network, PDN via the OMNI switch. Once the call is made the CALL LED will light indicating the unit is ready for data communication.

During a CALL, data is transferred from a terminal to the APM via the RS-232 interface. TXD signal along with the control signals are received at the APM by the receiver which convert the RS232 signal levels to TTL level and then multiplexed through a multiplexing device. These signals, containing data and control information are transmitted to the UART and a Register Gate Array respectively.

The UART and Register Gate Array convert the repective information to an 8 bit parallel data bus for interface to 65SC102 microprocessor Data from the microprocessor is released from the device using the UART interrupt signal which will indicate that the buffer is full and data is ready to be sent to the microprocessor.

Once this interrupt takes place data is transferred to the microprocessor to under program control it is submitted to the Mini-Packet Receiver Transmitter (MPRT) on the 8-bit parallel bus.

The MPRT then takes the data information and converts it to alternate mark invention, AMI pattern and forwards the data to the line down which in turn transmits bipolar AMI return to zero over the local wire loop to the VPLC which resides on the switch. The data at the switch is for the manipulated and forwarded to the appropriate destinction.

BRIEF DESCRIPTION OF THE DRAWINGS

An example embodiment is described with reference to the accompanying drawings in which:

FIGS. 10-24 disclose the memory maps for the various functions of the apparatus.

FIG. 25 is a timing chart showing the relations of some of the operations.

DESCRIPTION OF THE EXAMPLE EMBODIMENT

Figure 1:
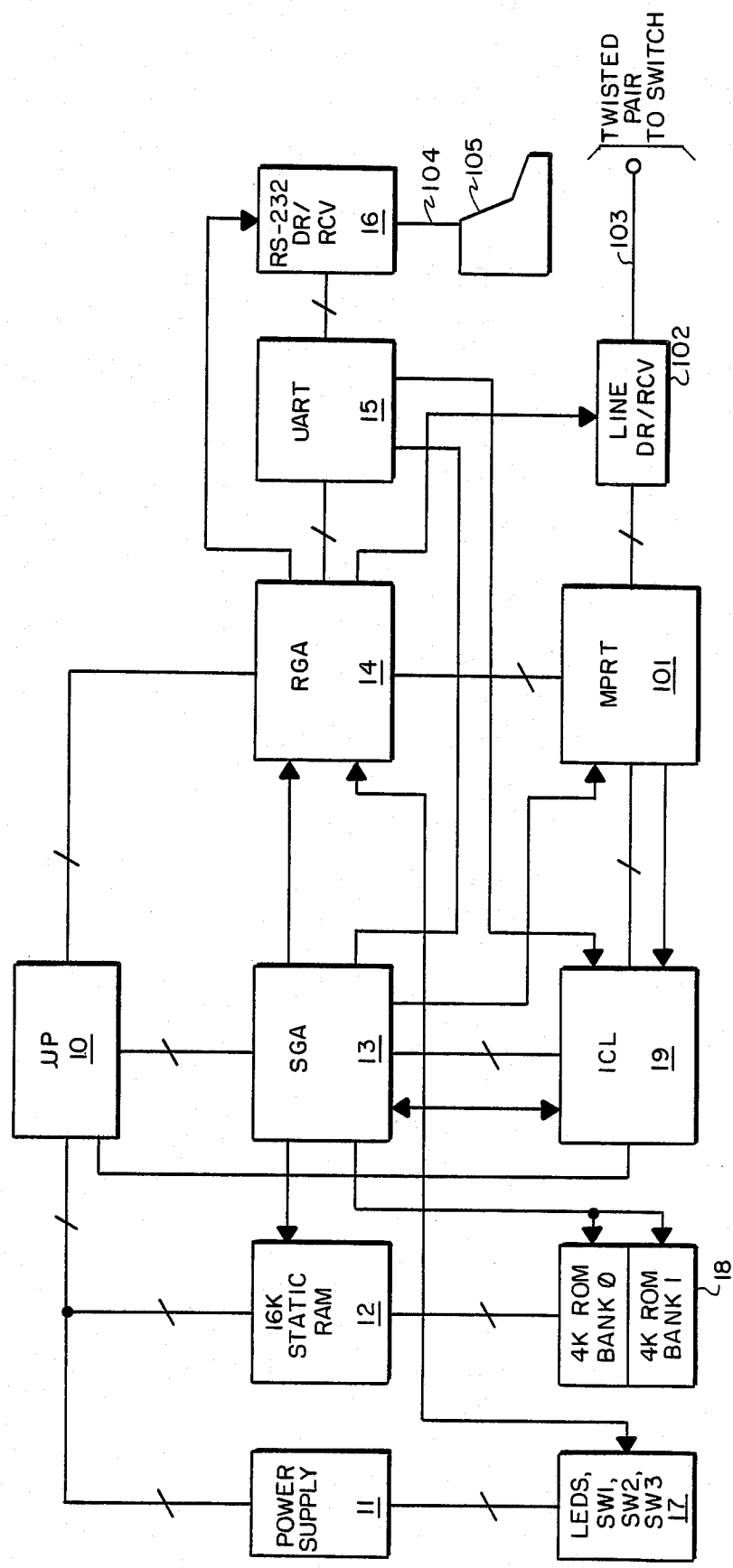
FIG. 1 is a block diagram of the asynchronous packet manager according to the invention.
Figure 2:
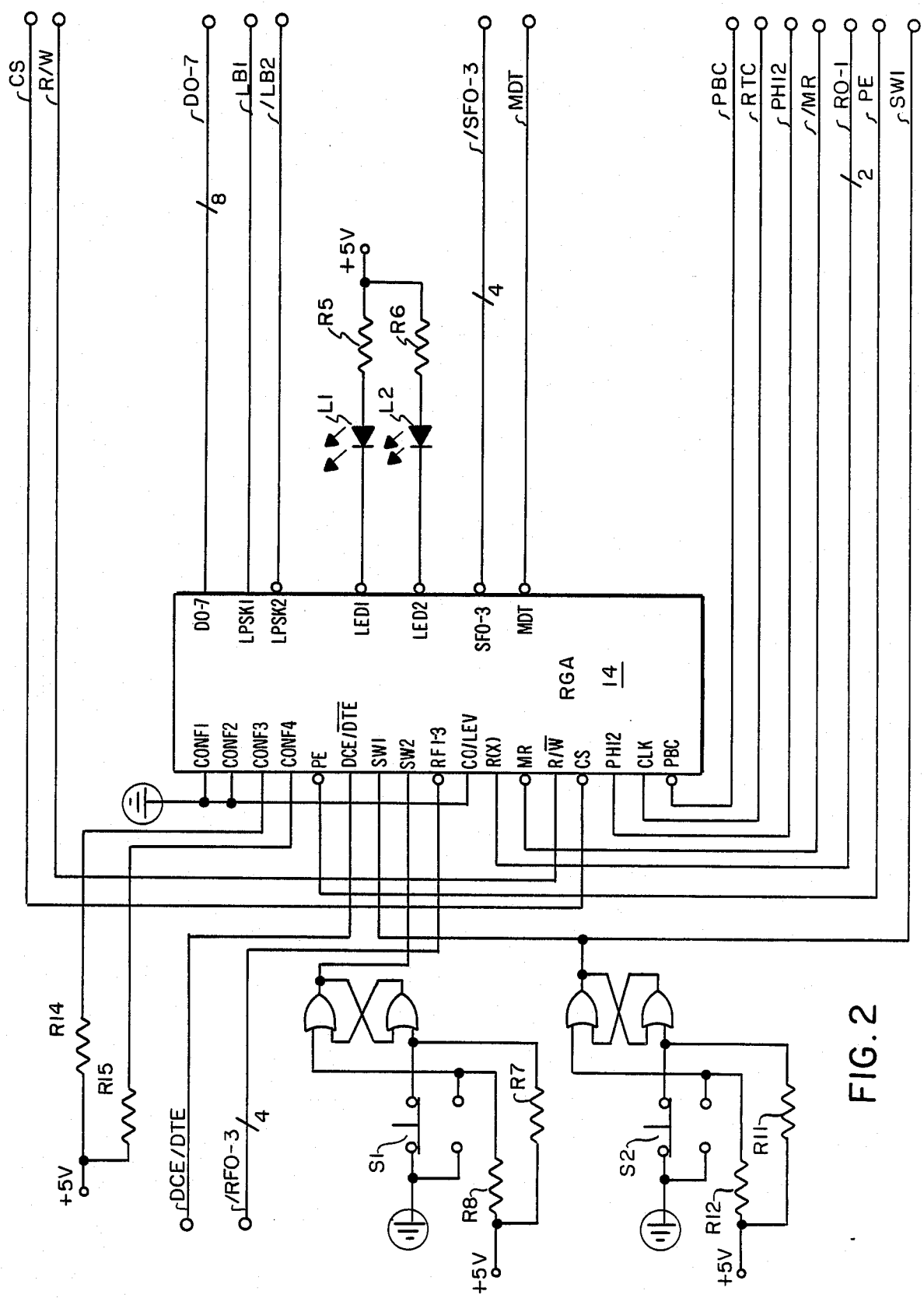
FIGS. 2-9 when connected together form a schematic circuit diagram of the packet manager.
Figure 3:
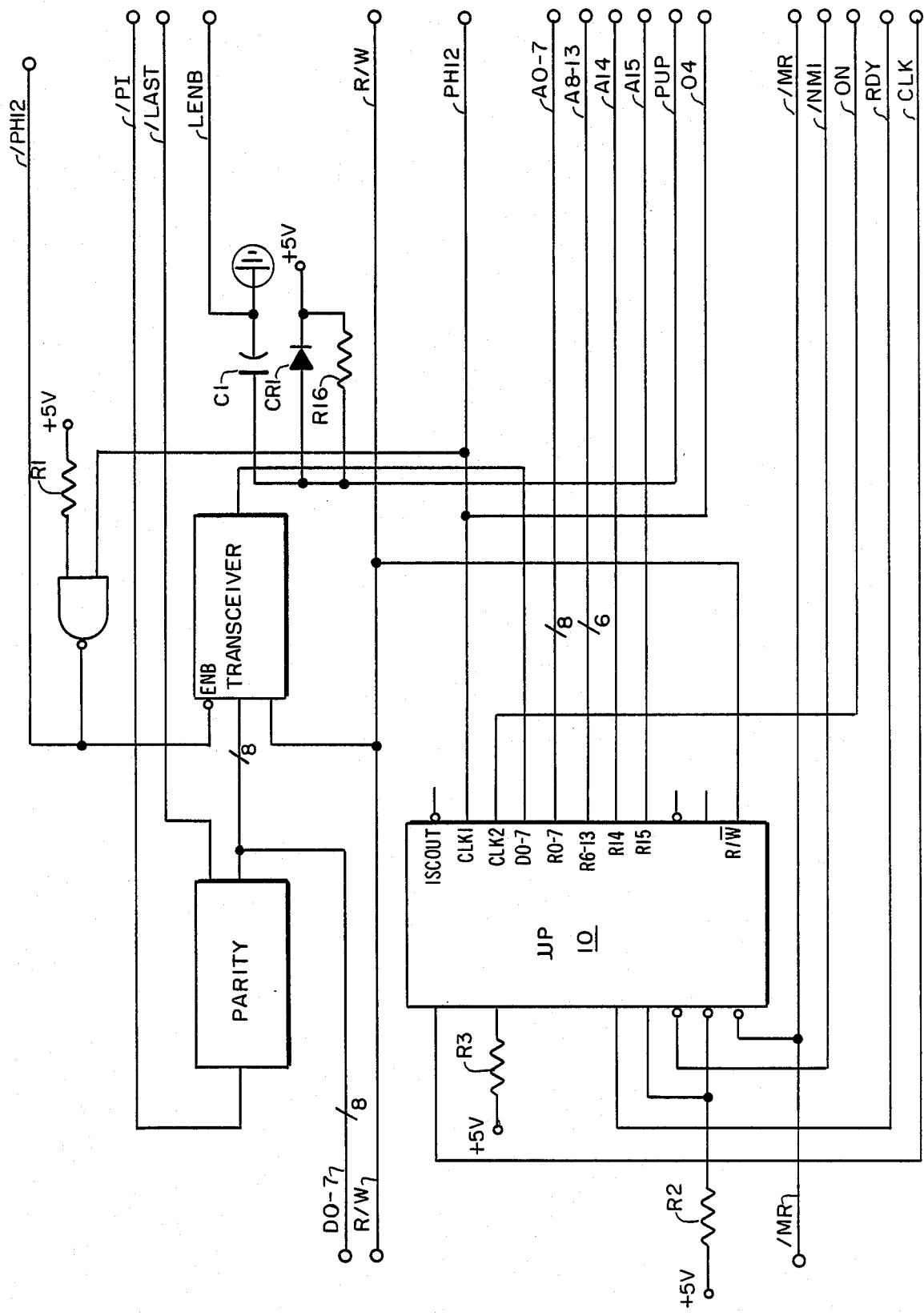
Figure 4:
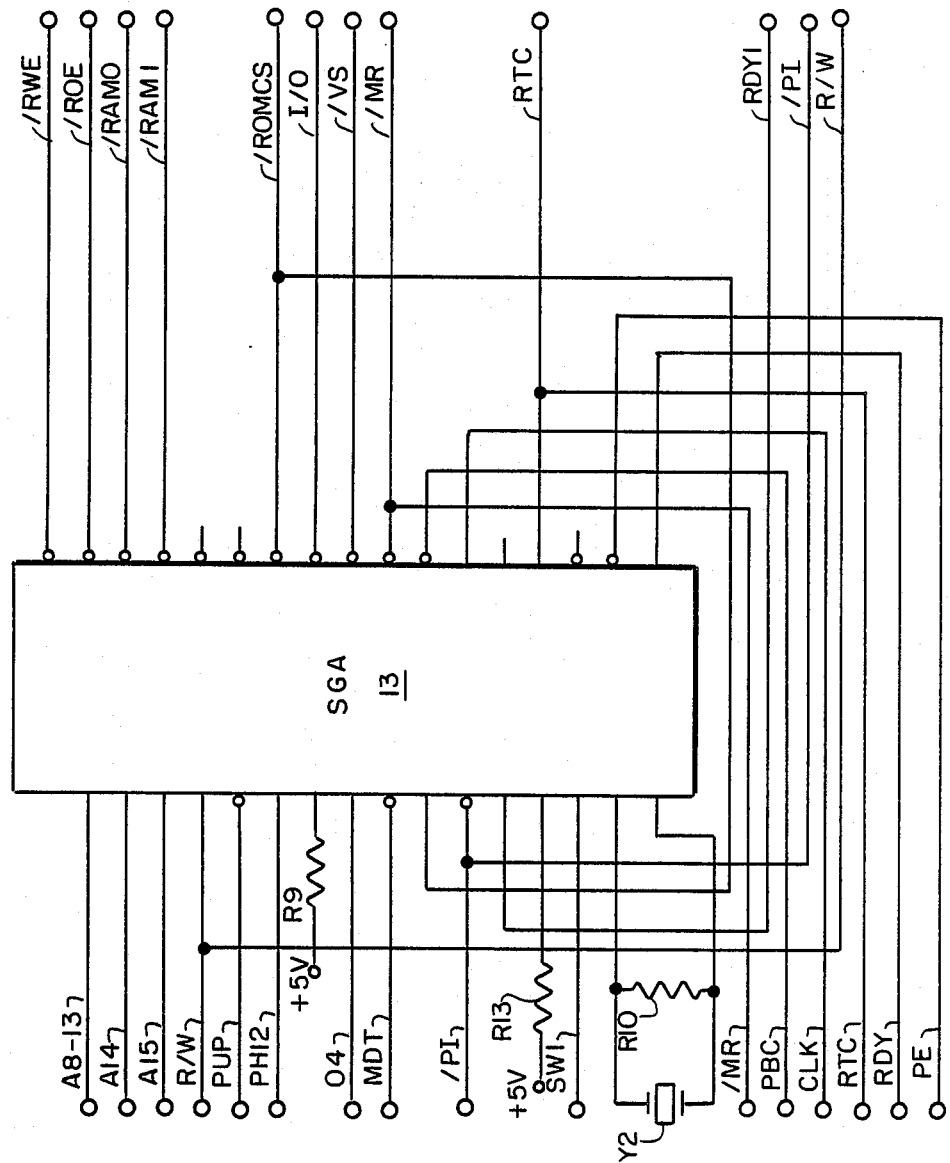
Figure 5:
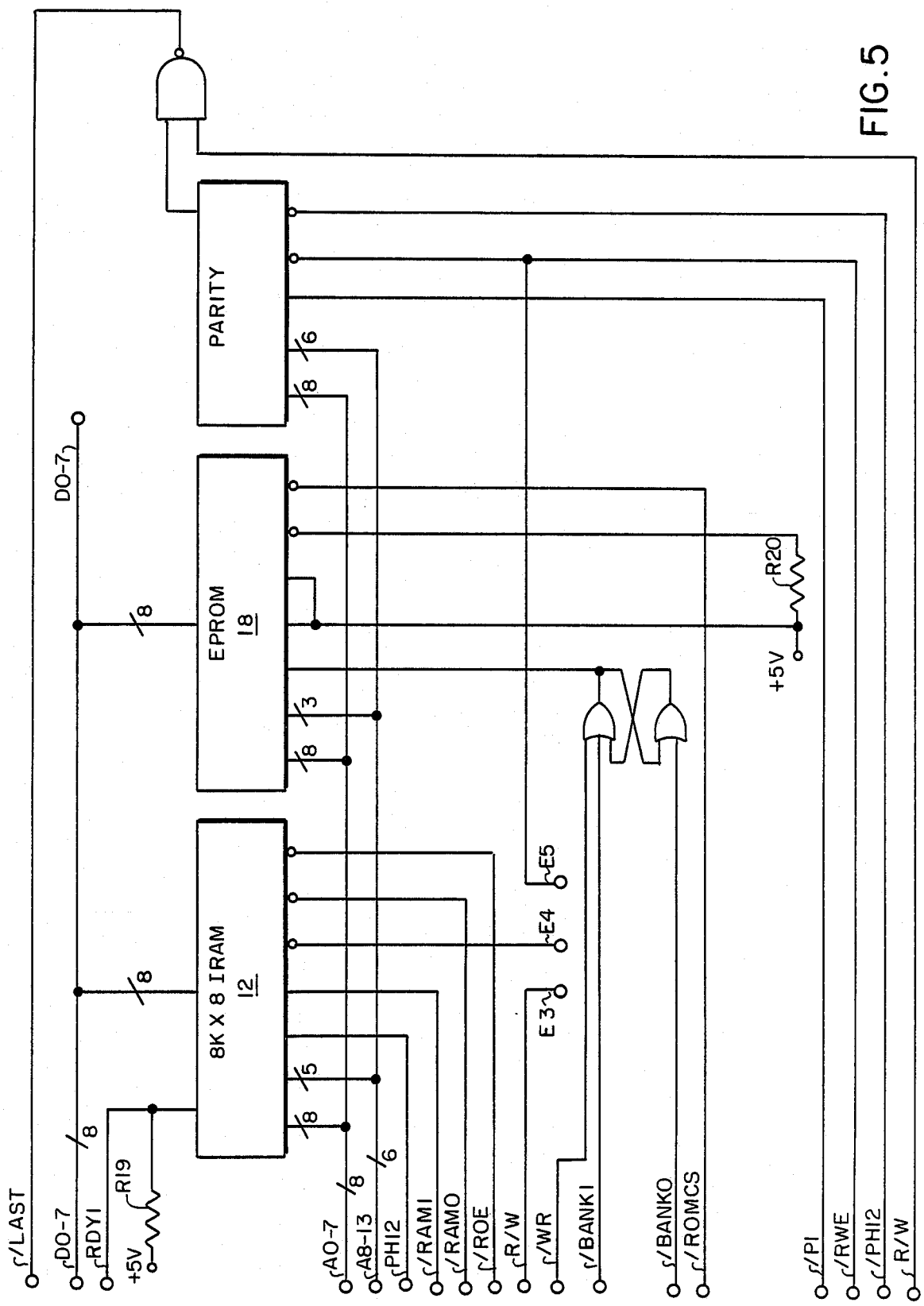
Figure 6:
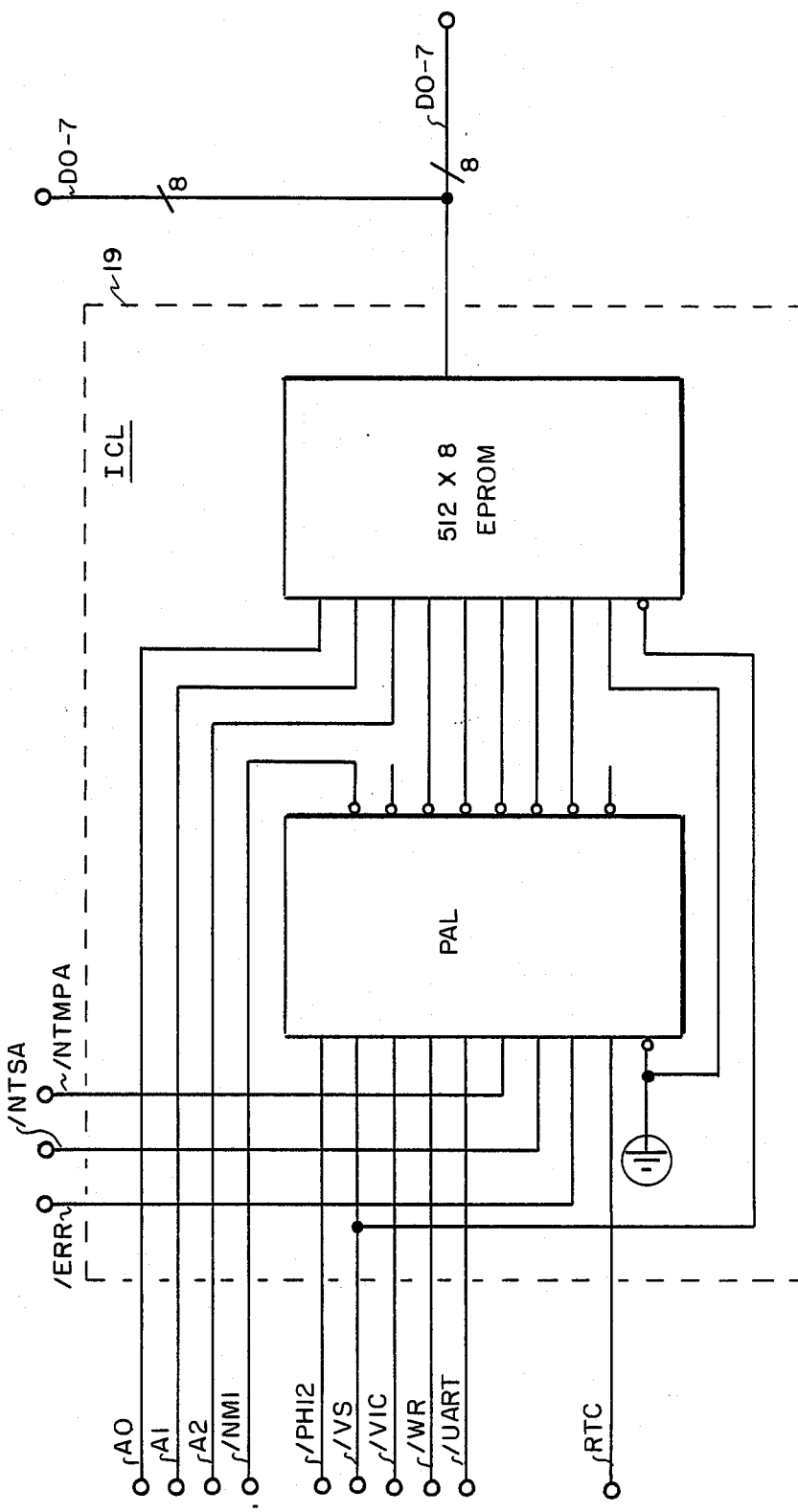
Figure 7:
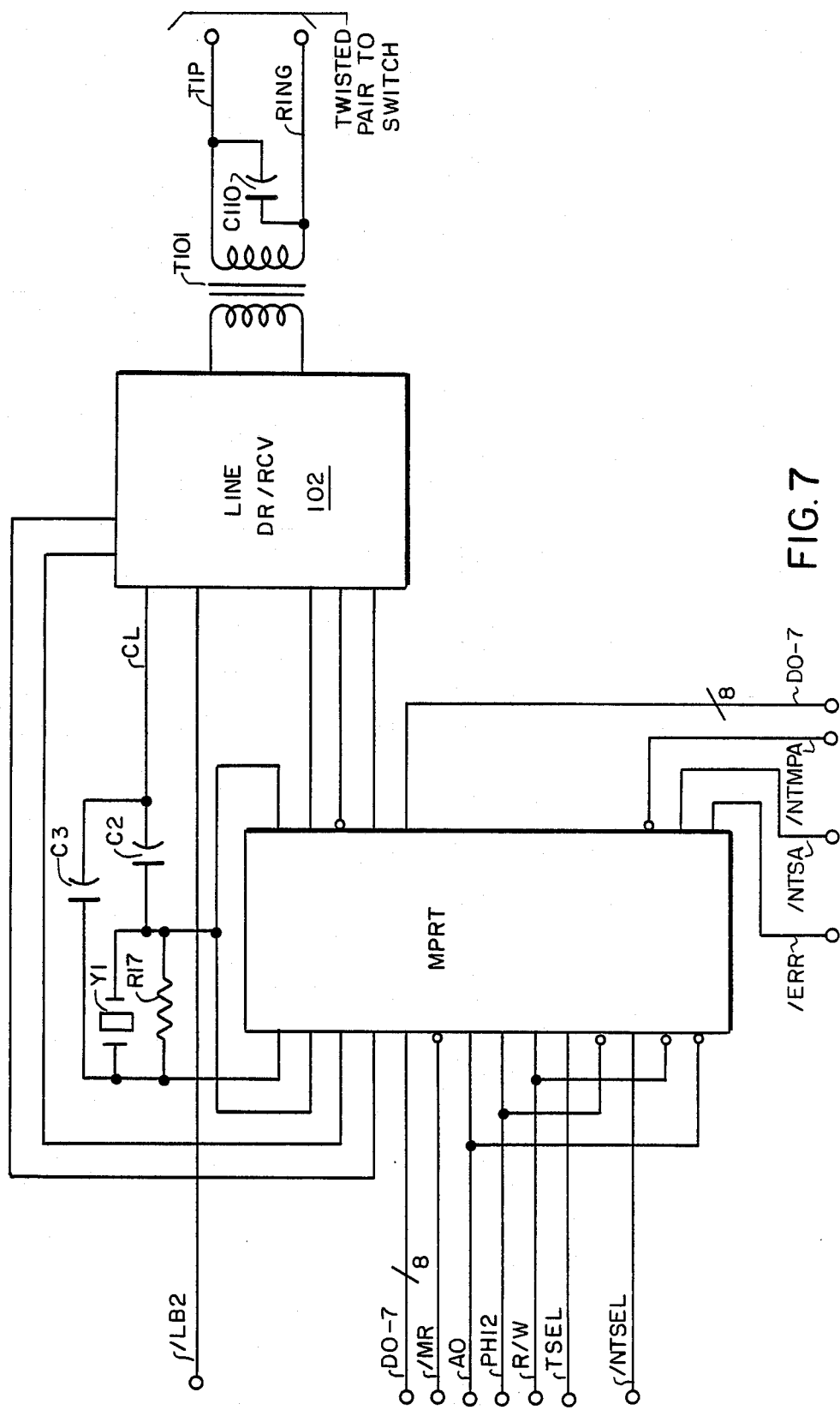
Figure 8:
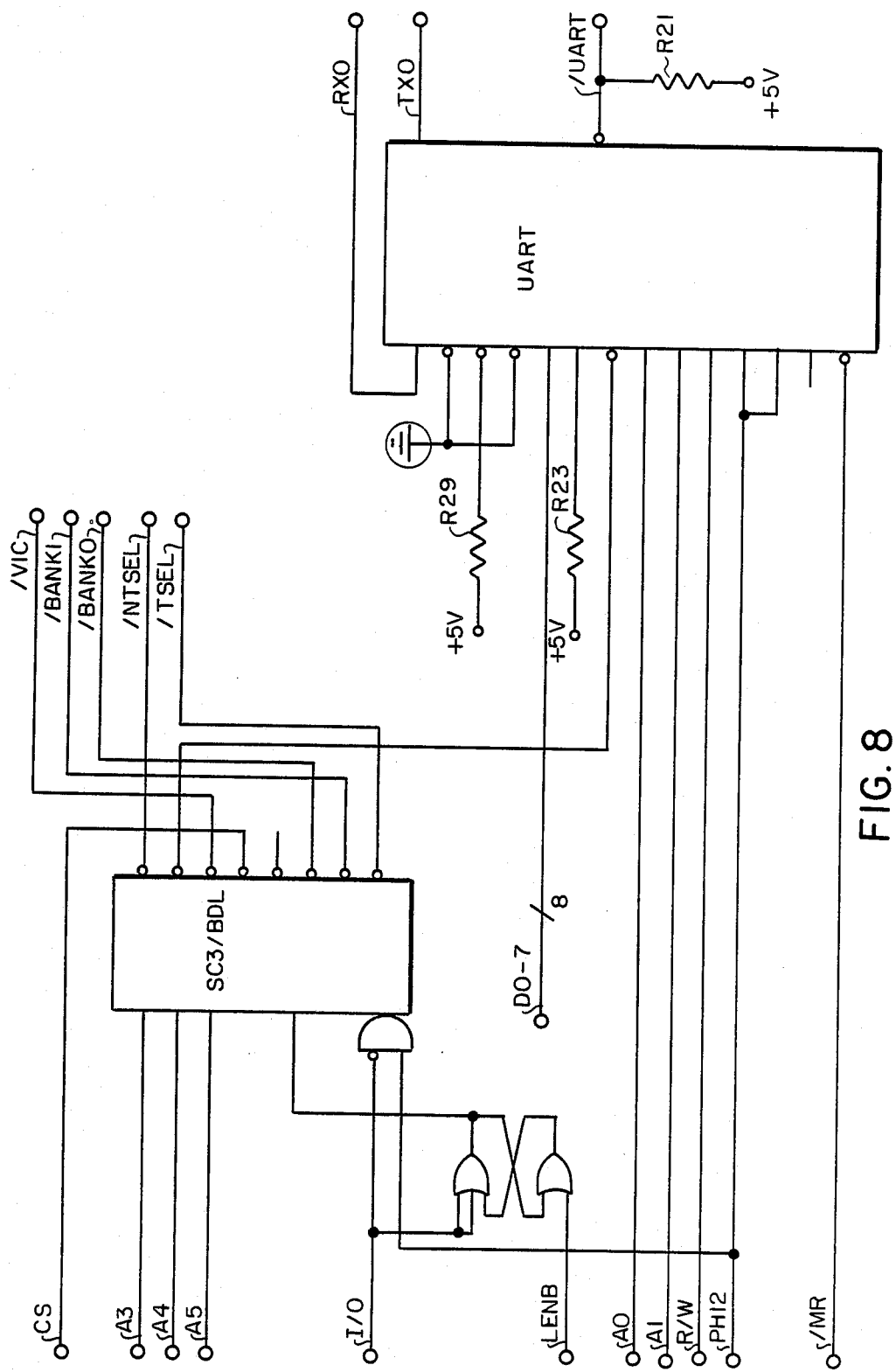
Figure 9:
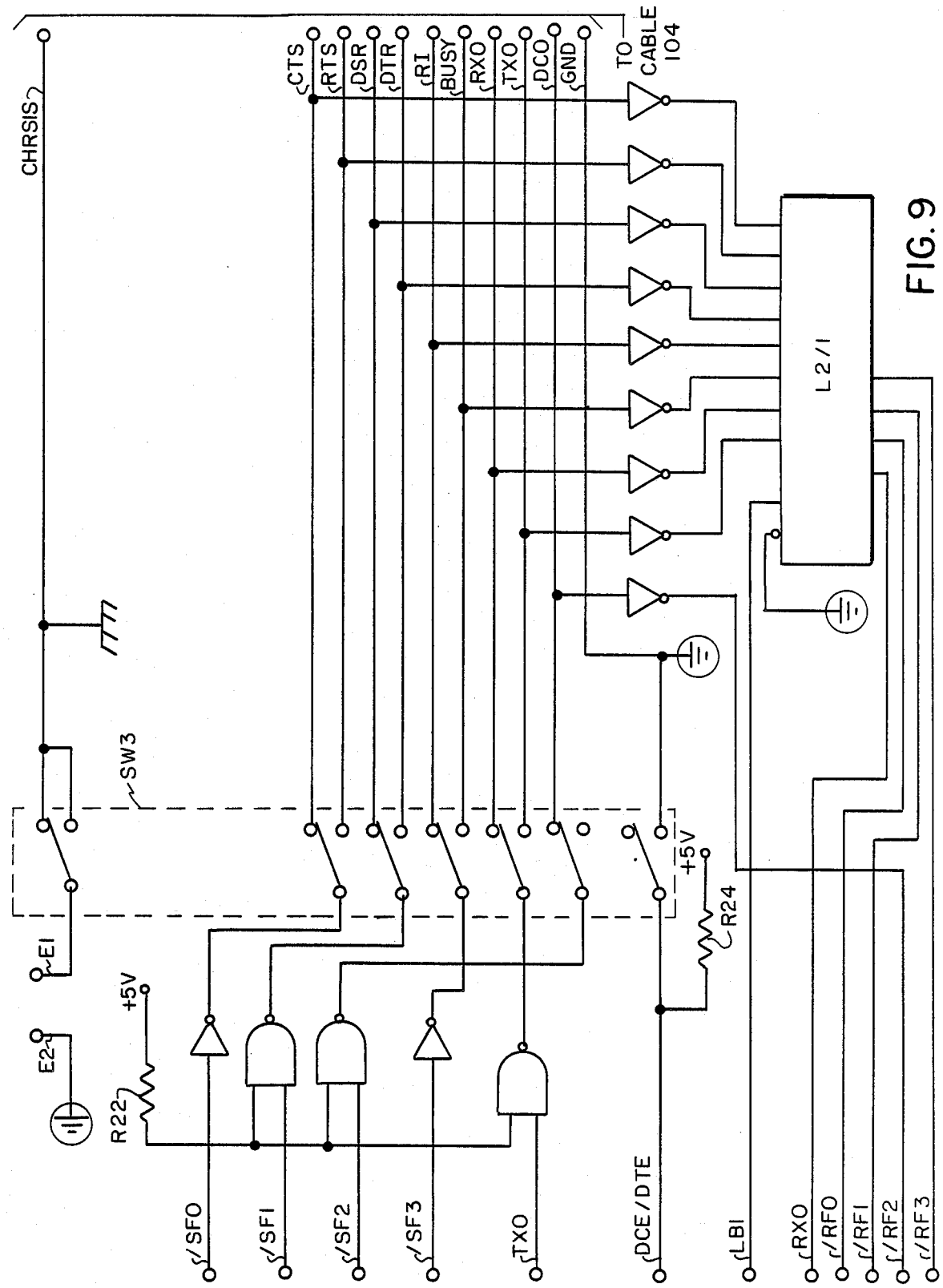
Figure 26:
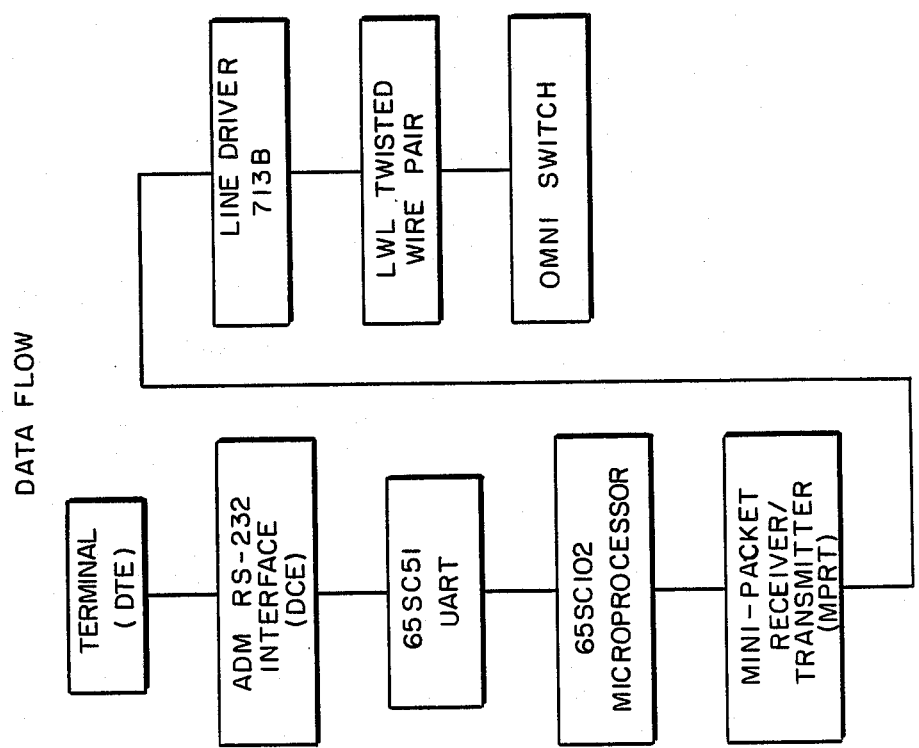
FIG. 26 shows the data flow through the Asynchronous packet manager.

In the description of the example embodiment power and ground elements required for the operation of the communication network are neither discussed nor illustrated, as these elements are well understood by person of typical skill in the electronic arts. Also in the interest of brevity, the generation and distribution of clock signals for the operation of the telecommunication switching network is limited to that which is convenient for an understanding of the communications networks. The embodiment illustrated in the drawings is constructed from "off-the-shelf" components, primarily silicon integrated circuits being mounted on printed circuit boards, sometimes referred to as cards. The printed circuit boards are connectable to back plane panels which carry various leads for conducting signals between the various circuit boards.

Microprocessor. The microprocessor 10 is a commercial unit designated 65C102 as manufacturer by Rockwell operating at a cycle frequency of 1.8432 MHz. A bi-directional 8-bit data bus transfers data between the microprocessor, memory, and the input and output devices.

System Gate Array. The System Gate Array 13 is responsible for generating device selects through address decoding, providing microprocessor control signals, and generating the Real Time Clock (RTC). The System Gate Array contains no registers and remains transparent to software.

16K RAM. The Ram 12 area consists of two 8K-by-8 static RAMs which can be implemented by Hitachi HM6264LP-15 8K-by-8 static RAMs. Parity protection is implemented for all of the 16K RAM by one 16K-by-1 fast static RAM (Hitachi HM616770ns, or equivalent).

8K ROM the 8K of Read Only Memory 18. Program and data storage is implemented in two 4K banks of ROM. Only one 4K bank can be selected and read at one time, however. This selection process is done by accessing specific I/O locations which enable either the upper 4K or lower 4K of ROM (the upper bank is selected on Reset). The ROM is an 8K-by-8 2764K as manufactured Intel.

Register Gate Array. The System Command/Status registers are implemented with register gate array 14. The register gate array contains the UART Send and Receive functions, switch and LED status, Watch Dog Timer (WDT), and microprocessor reset status.

6551 UART. The 6551 UART 15 is the communication device which interfaces to the asynchronous data equipment (typically a terminal or modem). The 6551 UARTS are made by many vendors (e.g., Rockwell).

MPRT. The MPRT 101 is the logical interface between the Packet Manager and the switch.

Line Driver Module. The Line Driver Module 102 is the physical interface between the Packet Manager and the switch. The module is composed of two analog ICS (EXAR C713 and C714) with bias circuitry, and an isolation transformer to the twisted wire pair 103.

Interrupt Control Logic. The ICL consists of a programmable array logic chip PAL and a PROM which generates prioritized vectored interrupts and reset vector to the micro-processor. Four level and one edge triggered interrupts are accepted by the ICL, all interrupts can be globally enabled and disabled by accessing specific memory locations. The PAL contains the interrupt processing logic while the prom stores the prioritized Interrupt, Break, and Reset vectors.

RS-232-C Drivers and Receivers. The physical interface between the Packet Manager and the asynchronous data equipment is the RS-232-C line drivers and receivers (Motorola MC1488 and MC1489A, or equivalent). The line drivers and receivers translate the UART serial data, send, and receive functions to RS232-C compatible signals.

Leds lights and switches two LEDs and three switches have been implemented on the Packet Manager as follows:

"LINK" LED—Indicates whether the Packet Manager is in the test condition or receiving/transmitting mini-packets.

"CALL" LED—Indicates call setup or loopback condition.

"LOOPBACK Switch"—When depressed, the LOOPBACK switch sets a bit in the RGA; a software polling service routine shall validate the switch condition and shall place the Packet Manager in loopback mode.

"RESET Switch"—Causes a Reset when depressed.

"DCE/DTE Switch"—this 2 position switch defines the Packet Manager asynchronous communication mode. When depressed, the Packet Manager is in DTE mode, allowing it to be attached to modems, for example. When released, the Packet Manager is in the DCE mode, allowing it to be attached to terminals and printers.

COMPONENT FUNCTIONS. This section describes in detail the listed modules. The reference designators correspond to those on the schematics.

65C102 Microprocessor. The microprocessor 10 accepts the "4-times", 7.3728 MHz CLKA output from the System Gate Array as its PHI input. Two microprocessor system clocks, PH12 and PH14, along with R/W and SYNC, qualify the microprocessor address (A0–A15) and data (D0–D7) buses. The /MR and RDY are generated by the Systems Gate Array according to the events monitored by the System Gate Array. The /NMI input to the 65C102 is activated by the ICL (19) whenever an interrupt occurs. Leds /SO and /IR are connected together and tied inactive to a 10K plll-up resistor. Also connected to a 10K pull-up resistor is terminated, which enables the address and data buses. The Not Connected outputs included /ML and OSC.

A bi-directional data transceiver, is attached to the 65C102's data bus to ensure that no bus collisions occur at the end of a clock cycle and also to provide the drive characteristics required of all the devices attached to the data bus. It is enabled only during the last half cycle by PH12; the 74LS00 gate and 10K pull-up resistors provide the necessary PH12 inversion for transceiver.

System Gate Array. Reset four events will cause the System Gate Array 13 to activate leads /MR: /PUP or /WDT active, SW1 rising edge, and Parity Error detection via R/W, EPEN, /SUM, RDY1, A8-A15, and PH12. Two types of resets occur on the Packet Manager; a Long Reset is generated after power-up which lasts 288 PH12 cycles (approximately 156 microseconds). A Short Reset occurs after a Reset Switch depression, WDT Timeout, or Parity Error detection and lasts 32 PH102 cycles (approximately 17 microseconds).

The Short Reset affects the Packet Manager as follows: Short Reset
Inhibit parity detection for 32 PH12 cycles.
Select ROM Bank 1.
Reset the WDT (but not WDTTO: FED8 bit 4).
Reset the RTC counter.
If in DTE mode, deactivates RS-232-C interface signals DTR, RTS
If in DTE mode, activate RS-232-C interface signal BUSY
if in DCE mode deactivate RS-232-C interface signals DCD, DSR
If in DCE mode, deactivate RS-232-C interface signals CTS, RI.
Extinguish LINK and CALL LEDs.
Set Line and UART to Non-Loopback mode.
Reset the MPRT.
If in DTE mode, set BUSY: FEDA bit 3.
If in DTE mode, reset DRR: FEDA bit 1.
If in DTE mode, rest RTS: EEDA bit 0.
If in DCE mode, reset RI: FEDA bit 3.
If in DCE mode, reset DCD: FEDA bit 2.
If in DCE mode, reset DSR: FEDA bit 1.
If in DCE mode, reset CTS: FEDA bit 0.
Reset LINK LED: FED9 bit 3.
Reset CALL LED: FED9 bit 2.
Reset LINE LPBK: FED9 bit 1.
Reset UART LPBK: FED9 bit 0.
Reset UART Control register: FECB bits 7–0.
Reset UART Command register FECA bits 7–0.
Reset UART IRQ: FEC9 bit 7.
Set UART TORE: FEC9 bit 4.
Reset UART RDRF: FEC9 bit 3.
Reset UART OVRN: FEC9 bit 2.
Reset UART FE: FEC9 Bit 1.
Reset UART PE: FEC9 bit 0.

A long reset, associated with powerup, will perform all the actions of a Short Reset Listed above with the addition of:

| Long Reset |
|---|
| Reset RAM PE: FED8 bit 7. |
| Set PO: FED8 bit 5. |
| Reset WDTTO: FED8 bit 4. |

Long Reset. The reset sequence is slightly different for/PUP than it is for the other three reset conditions: /PUP is active during power-up when the +5 v line is between o and approximately 2.8 volts CR1 will quickly discharge C1 when the +5 v line drops below approximately 3.5 V0. On the SGa, the /PUP input hysteresis points are at 2.8 volts (active) and 1.3 volts (inactive). After the 2.8 volt threshold has beeneexceeded, /PUP becomes inactive and initiates a Long Reset. /POC, used to indicated a power-up sequence to the Register Gate Array 14, is active whenever /PUP is active. When /PUP becomes inactive, as defined above, /POC becomes inactive a minimum of 1 and maximum of 2 cycles later. Hence, /POC can be considered as a "clean" (i.e. a non-oscillating signal with rise and fall times and voltage swings commensurate with the other System Gate Array outputs) indication of power-up which is synchronized to PH12 LED/MR is also active whenever /PUP is active, but stays active an additional 288 cycles after/POc becomes inactive. At the beginning of the power-up sequence (specifically, one cycle before/POC becomes inactive), RAM0 and /RAM1 outputs become active for one cycle. This ensures the proper initialization of the Intel 2186 RAMs 12.

Short Reset. A Short Reset is cause by any of the following three events: /WDT active, SW1 rising edge, or Parity Error detection. /WDT is an output from the Register Gate Array 14 which indicates a Watch Dog Timer Time Out when active. The duration of /WDT is between 1 and 2 cycles, depending on when the timeout occurred relative to PH12. /WDT will appear to the SOA as a pulse and is generated by the Register Gate Array 14 as follows: /WDT is activated by Register Gate Array and presented to the System Gate Array, the System Gate Array recognizes /WDT on PH12 rising and activates /MR at PH12 falling. /MR resets the Register Gate Array, causing /WDT to become inactive. When the System Gate Array sees /WDT inactive, it begins a Short Reset. /MR will remain active as long as /WDT is active; this method of holding /MR active indefinitely is active; this method of holding /MR active indefinitely is used reset while it initializes memory.

S1 is activated by the Reset Switch at the rear of the Packet Manager and is debounced in hardware by the SR latch and two 10K pull-up resistors.

A Parity Error activates /PE for one cycle and is detected at PH12 falling when all of the following conditions are true: /SUM inactive, A8-A15 in the inclusive range 0000-EDFF, R/W =1 (read access), RDy active /SUM is an indication of parity determined by the 16k-by1 parity RAM, a 74LS00 xxxx and the 74LS280. Parity is computed as follows: A write cycle to RAM will force /LAST high, causing PI to reflect odd parity over D0-D7. PI is then stored in RAM as the parity bit for the particular location addressed. When the location is read the gate inverts the parity bit and LAST reflects even parity. The data at gate 3 are then summed with /LAST (even parity previously computed) to yield a result at/SUM Lead /SUM, then, will be low if parity is "good" and high if parity is "bad" EPEN, the high-true External Parity Enable signals, is tied to /ROMCS so that parity checking is disabled when the ROM is accessed.

Address Decoder. The System Gate Array 13 address decoder generates /RWE, /ROE, /RAM0 /RAM1, /ROMCS, /I/O, and /VSP according to the inputs R/W, AB-A15, PH12, PH14, and the outputs /MR and RDY /ROE, valid during the last ½ cycle, is the read strobe for device selects /RAM0 and /RAM1 which are valid during the last ¾ cycle. is the read strobe for device selects /RAM0 and /RAM1 which are valid during the last ¾ cycle. When E3 are strapped, R/W from the 65C102 becomes the write strobe so that the Hitachi RAMs 12 can be accommodated. /ROMCS and VSP, both valid during the last ¾ cycle, enable the ROM 18 and Interrupt Control Logic 19 respectively. The remaining device select, /I/O, is also valid during the last ¾ cycle and enables the 3-8 decoder, U20 74LC137)- /I/O is inverted by the gate to provide an address strobe for the 3-8 decoder this ensures that A3-A5 remain latched within the decoder during the last ½ cycle when the second enable, PH12, is high; these eight outputs are the individually decoded I/O device selects and interface directly to each I/O device.

Ready Logic. RDY1 is the high true wired-and signal from the RAM 12 requesting a wait state when inactive (low). The System Gate Array latches lead RDY1 and presents the "clean" RDY signal to the at the appropriate cycle time, The other "ready" input, RDY2, is tied active by a 10K pull-up resistor.

Oscillator. A 7.3728 MHz crystal and bias resistor are connected to XTAL1 and XTAL2 to sustain the System Gate Array clock oscillator. The oscillator output, CLKA, is of the same duration and phase as XTAL1 (but delayed slightly) and connect to the microprocessors PHI input. (PHI, in turn, is divided by 4 by the microprocessor to produce PH12 and PH14.)

PH12 is divided by 6144 to produce a signal RTC of frequency 300 Hz. RTC is the edge triggered interrupt input to the Interrupt Control Logic 19 and the CLK input to the Register Gate Array 14 WDT. PH12B, monitored by the System Gate Array in dual microprocessor systems to synchronize PH12 and Ph123B via CLKB, it is not used on here and is pulled-up by 1 10K resistor. The Not Connected outputsiincluded CLKB, /PCS, /CM1 and /CM2.

16K RAM. Two 8K-by-8 RAMs 12 along with one 16K-by-1 RAM form 16K of "parity-protected RAM". Hitachi HM6264P-15 (150 ns) RAMs, or equivalent, can be installed. The parity RAM can be implemented with Hitachi HM6167P-8 or equivalent.

The Hitachi 6264 is an 8K-by-8 static RAM whose operation is typical of other static RAMs. A read cycle is similar to other RAMS and is initiated when /CE (pin 20, CE2 (pin 26), and /OE (pin 22) all become active. The /CE for either /RAM0 for the first section U12 or /RAM1 for the second section is valid for the last ¾ cycle, signal /OE becomes active for the last ½ cycle. Signal CE 2 is attached to PH12 to enable the RAMs only during the time that PH12 is high (last ½ cycle).

The 6264 write cycle timing is somewhat different in that it requires valid data at the end of the cycle. With the shorting bar across E3-E4 the write strobe to /RWE is R/W, valid for the last ¾ cycle.

See FIG. 24. A 6264 write cycle proceeds as follows: R/W and /RAM0 (or /RAM1) become active around PH14 rising. PH12 rising enables the RAM as data is valid on D0-7. PH12 falling disables the RAM and ends the write cycle; R/W and /RAM0 (or /RAM1) become inactive a short time later. Note that PH12 is required to enable and disable the 6264 on write cycles because of the short 65C102 data hold time.

8K ROM A GTE G5365 8K-By-8 ROM, 18 is logically separated into two 4K-by-8 banks. The selection between Bank 0 and Bank 1 is determined by an R-S latch which accepts the I/O devices selects /BANK0 and BANK1 (from the 3-to-8- I/O decoder, and /MR. The latch output is attached to the G5365's high order address bit, A12. The A12 input will be set high after a Reset or if Bank 1 is selected (via the I/O decoder); the A12 input is set low after Bank o is selected. Signals /ROMCS, a device select from the System Gate Array, is attached to pin 20 (/CE) and 22 (/OE). /ROMCS is active during the last ¾ cycle. The other G5365 device selects are tied active by the 1CK pull-up resistor.

Register Gate Array. The signal interfaces to the Register Gate Array 14 are as follows.

Register Selection Signals /CS, /MR, PH12, R/W, A0, and A1 select the Register Gate Array registers and enable the Register Gate Array for read and write operations. Data transfers occur during PH12 active internal provided the Register Gate Array is selected and enabled.

Configuration Straps CONF0 and CONF1 are tied to ground and COMF2 and CONF3 are pulled high (via two 10K resistor each) to define the particular board other boards will have different straps. The configuration bits will then be read as (hex) C.

Receive Functions /RF0, /RF1, /RF2, AND /RF3 are the Receive function form the 74LS157 a 2-to-1 MUX. The EDGE/LEVEL input (of 14 pin 22) is grounded so that the Receive Functions are captured in Level Mode.

Send Functions three of the four Send Functions, /SF0, /SF1, and /SF2 are latched outputs and interface directly to the line drivers 102. The remaining Send Function, /SF3, is also latched and also interfaces to a line driver but is initialized to the state of the DCE/DTE input after a Reset (MR or /POC active). /SF3, correpponding to the J1 signals BUSY and R1, is initialized so that when the TB is in DTE mode (S3 depressed) then BUSY is active; when the TB is in DCE mode (S3 released) then RI is initialized to its inactive state.

LEDs and Switches LED1 and LED2 outputs sink the 2 ma of current necessary to light the low current LCDs L1 and L2 when active.

The two switch inputs SW1 and SW2 reflect the status of S1 and S2. SW1 is the same signal that attaches to the Systems Gate Array and has already been discussed. S2 is debounced in hardware by an R-S latch and two 10K pull-ups resistors to produce SW2. Unlike SW1, SW2 is an active low input to the Register Gate Array.

Loopbacks LB1 and /LB2 are two loopback outputs which interface to the RS232-C logic and LDM. LB1 is Exclusive ORed with the DCE/DTE input within the Register Gate Array so that it can be used as the SELECT input to U7 74LS157, a 2-to-1 MUX for the Receive Functions. (The 2-to-1 MUX and the Register Gate Array Exclusive OR logic combine to form an extremely efficient method of looping the Send Functions to the Receive Functions regardless of whether the terminal is configured for DTE or DCE mode.) LB2 is connected to the line drive receiver Line Receive I. C. so that MPRT transmitted data is looped back to the MPRT receive data port.

Watch Dog Timer. The Register Gate Array Watch Dog Timer accepts RTC from the System Gate Array (of frequeccy 300 Hz, period 3.33 MSEC) and divides it by 32 to establish a WDT Time Out period of 106.7 MSEC (approximately 1/10 second). If the WDT is activated and not sustained, then after 106.7 msec, /WDT (pin 15) will become active; the SGA will recognized /WdT on the next PH12 rising edge and issue a Reset which, in turn, will cause the RGa /WDT signal to become inactive.

Status Bits /POC is the synchronized power-up signal from the System Gate Array is used to initialized several Register Gate Array register bits. /PE is also a signal from the System Gate Array, lasting one cycle when active, which is latched by the Register Gate Array and presented to a register bit.

65SC51 UART PH12 provides the UART 15 with a 1.8432 MHz clock at XTAL1 (pin 6) which is divided internally to produce a several programmable baud rates, including 600, 1200, 2400, 4800, and 9600. Selection of the UART registers are via R/@, A0, and A1; the registers are enabled by CS0, which is tied active by a 10K register, and /USEL, an I/O device select from U20. Several UART register bits are initialized by/MR. /DCD (pin 16) /CTS pin 9) are tied active (to ground) to enable the receiver.

/DSR pin 17) is a UART status bit normally connected to the Data Set Ready signal at the RS-232 interface. However, it is used in this application to define whether or not the optional key pad is installed. The DSR input will be pulled high by a 10K resistor when the key pad is not installed, and will be low when the key pad is installed.

TXD (pin 10) is attached to a 1488 driver while RXD is input from the 2-to-1 Receive Function MUX, 74LS157 The Interrupt Request output (pin 26), /UART, becomes the highest priority interrupt of the ICL; 10K resistor pulls /UART signal high when it is not active. The No Connect output signals include RXC (pin 5), XTAL2 (pin 7), /RTS (pin 8), and /DTR (pin 11).

Mini Packet Receiver Transmitter (MPRT) A 4.096 MHz crystal (Y1), 1 Meg-ohm bias resistor, and two frequency - stabilizing 12 pf capacitors (C2 and C3) form the MPRT oscillator (at pins 2 and 3) and baud rate clock (pin 4).

The MPRT contains two separate interfaces to the microprocessor bus: a Non-Transparent interface for data packets and a Transparent interface for voice packets. Because the terminal is concerned with communication of data packets, only the Non-Transparent features of the MPRT are actually used. However, both the Non-Transparent and Transparent features of the MPRT are implemented so that they both can be accessed by software. This is to solve the potential problem when Transparent mini-packets are accidently sent to the terminal and fill up all of the MPRT receive buffers; the only way to clear the buffers and alleviate the problem is by reading the Transparent mini-packets.

Except for the select leads /NTSEL (pin 18) and /TSEL (pin 24,), the Non-Transparent and Transparent register enables, selects, and data bus are attached in parallel and to the microprocessor interface signals R/W (pins 15 and 25), A0 (pins 16 and 24), PH12 (pins 17 and 27), D0-D7 (pins 5–12 and 28–35), and /MR (pin 13). Three interrupts interface to the ICL: /NTMPA (pin 20), /NTSA (pin 19) and /ERROR (pin 14). The complementary signals TXA (pin 36) and /TXB (pin 37) interface to the LDM transmitter, while RXA (pin 40) and RXB (pin 39) interface to the LDM receiver. The Transparent interrupts /TSA (pin 23) and /TMPA (pin 22) are left unconnected.

Line Driver. The LDM consists of two bipolar arrays a receiver, and a transmitter, bias circuitry resistors, capacitors and diodes a transmitter transistor a loopback transistor and a 1-to-1 isolation transformer T101. The transmission wire is attached to T101 pins 1 and 2 by an RJ12 connector (J2) at pins 2 and 5 (TIP and RING). AVCC and AGND form the analog voltage references which are attached to the digital voltage references, +5V and GND, at one location. At this connection point are two noise-filtering capacitors:

Interrupt Control Logic (ICL) A 16 r8 Programmable Array Logic (PAL) and 512-by-8 PROM combine to form the ICL which supervises all interrupt requests. The ICL accepts four level and one edge interrupt, activates NMI, outputs the prioritized interrupt vector, and can be enabled and disabled. The four level interrupts are, in order of priority form highs to lowest: /UART (pin5), /NTMPA pin 6), /NTSA pin 7) and /ERROR (pin 8). The edge triggered interrupt, RTC (pin 9) has the lowest priority of any interrupt.

All five interrupts are sampled at the end of a cycle when /PH12 rises. When an interrupt is detected, /NMI (pin 19) is activated, causing the 65SC102 to fetch a vector via /VS from the SGA address decoder. The ICL latches all interrupts when /VS pin 2) is active and presents them logically inverted to the PROM address bits A3–A7. PROM address bits A0–A2 are the system address bits A)–A2 which are used by the PROM to determine if the vector fetch is for a Rest, Break, or NMI. The remaining address bit, A8 (pin 19), is tied Iou to enable the "A" bank of vectors (the "B" bank of vectors is used for the B-Side ICL in dual microprocessor systems). The PROM is enabled during the last ¾ cycle when /VS is active.

RS-232 Drivers and Receivers 1488 type drivers, convert the TTL signals of the 65SC51 UART and Register Gate Array to RS-232-C compatible signals. All five RS232-C signals (ATXD, ASF0, ASF1, ASF2, ASF3) pass through S3, and 8-pole double-throw slide switch. S3 directs the RS-232 signals to the appropriate connector pin depending on whether it is in the DCE (release) or DTD (depressed) position. S3 indicates its position to the Register Gate Array via the signal DCE/DTE. DCE/DTE is pulled up by 10K resistor when S3 is released (DCE mode) and grounded by a switch closure when S3 is depressed (DTE mode). S3 will also connect chassis ground (CGND), to signal ground (GND) when it is in the DCE position, provided a shorting bar is placed across E1–E2. CGND encircles the perimeter of the PC board (to be used as a static shield) and attaches to the RS-232-C connector (J1) signal CHASSIS.

The 1489 type receivers accept nine RS-232-C signals (CTS, RTS, DSR, DTR, RI, BUSY, RXD, TXD, DCD) and convert them to TTL compatible signals. With the exception of DCD, all of the received signals are multiplexed through 2-to-1 MUX. The Register Gate Array signal, LB1, defines which set of receive functions is multiplexed to the 65SC51 UART and the Register Gate Array. (FIG. 23)

Software Interfaces Memory Map FIG. 10 is the Map of the 16K Memory divided into its major block. Each of these blocks is described in detail in following subsections.

16K RAM Map (FIGS. 10–11) 16K of parity-protected RAM resides in the first 16K of memory. It is important that, after power-up, this RAM area is initialized before any read operations are performed (a read operation includes any 65SC102 instruction that performs a read cycle or "false" read cycle). The RAM area can be initialized by writing any data to all locations 0000 through 3FFF, inclusive, which will set the Parity RAM accordingly. Failure to initialized RAM before reading may cause a Parity Error (setting FED8, bit 7) and a Reset.

NOT USED Space the space 4000 - EDFF is not implemented with any devices and is NOT accessed. If any of locations 4000 - EDFF are read, a Parity Error and Reset occur.

ROM (FIG. 12) the 8K of a program and data storage are implemented in two 4K banks of ROM. After a Reset, Bank 1 is selected and through the ICL program execution begins at f000. Bank 0 is selected by reading or writing to FEE8. Bank 1 can be reselected by reading or writing to FEF0. Both Bank 0 Bank 1 reside at the same address space, namely EE00–FDFF, inclusive.

I/O MAP (FIG. 13) contained within the I/O address space are the MPRT registers, the UART registers, the Command/Status registers, the ICL registers, and the registers which switch the ROM banks. Each of the I/O registers are defined in the following subsection.

MPRT Transparent Registers ( FIG. 14) the MPRT registers are used for transparent data communication and are located at FEF8–FEFF. FEF8 is the MPRT transparent data register, FEF9 is the MPRT transparent command/status register and FEFA–FEFF are not defined.

Switch ROM Bank 1 (FIG. 15) a read or write to FEF0 will select Bank 1 of the ROM (data are discarded). Bank 1 is the upper 4K of 8K ROM and is also selected on a Reset.

wwitch ROM Bank (FIG. 16 ) a read or write to FEE8 will enable Bank 0 of the ROM (data are discarded). Bank 0 is the lower 4K of the 8K ROM.

Command/Status Register (FIG. 18) the registers FED8, FED9, and FEDA are implemented with the Register Gate Array using R0 R1, and R2, respectively. In FEDa, the prefix * indicates DTE mode, and the prefix @ indicates DCE mode.

ICL Register ( FIG. 19) the IC1 enable register is located at FED0. The ICL is disabled after a Reset or after any interrupt occurs. FED0 must be accessed at the end of an interrupt service routine to ensure that the ICL is sequence properly. If no interrupts are pending, the ICL can be disabled by READING a Vector Space location (FF00) - FFFF).

UART Registers (FIG. 20) the G65SC51 UART registers are located at FEC8–FECB. The locations FECC–FECF are not defined.

MPRT Non-Transparent Registers (FIG. 21) The MPRT non-transparent registers are located at FEC0–FEC1. The locations FEC2–FEC7 are not defined.

Vector Space (FIG. 22) Vector Space indicates a portion of the total address space that has been reserved for the ICL. The locations FF00–FFFF are not intended for data storage or retrieval, but are monitored by the ICL to validated interrupt, break, and reset requests from the 65SC102 microprocessor; the ICL will then generate the appropriate vector.

Vector Space is also used to disable the ICL when no interrupts are pending; this is accomplished by READING any Vector Space location (data are discarded).

We claim:

1. In a telecommunication switching network for interconnecting data units arranged to transmit data in a first format to a switching unit arranged to switch data of a second format;
   a universal asynchronous receiver transmitter module (UART);
   an interface operated to convert incoming data to TTL levels and connected to said UART;
   a parallel data bus;
   said UART operated to convert received serial data into a parallel form and place it on said data bus;
   a microprocessor connected to said parallel data bus;
   a minipacket receiver transmitter connected to said microprocessor and to said parallel data bus;
   said microprocessor operated upon data presented on said parallel data bus to control said minipacket receiver transmitter to accept said data;
   said minipacket receiver transmitter operated upon receipt of said data to format said data into minipackets and convert said formatted data to an alternate mark inversion signal for connection to a switching network.

* * * * *